US011039137B2

(12) United States Patent
Zhao et al.

(10) Patent No.: US 11,039,137 B2
(45) Date of Patent: Jun. 15, 2021

(54) ENCODER, DECODER, COMPUTER PROGRAM AND COMPUTER PROGRAM PRODUCT FOR PROCESSING A FRAME OF A VIDEO SEQUENCE

(71) Applicant: Huawei Technologies Co., Ltd., Shenzhen (CN)

(72) Inventors: Zhijie Zhao, Munich (DE); Max Blaeser, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/730,800

(22) Filed: Dec. 30, 2019

(65) Prior Publication Data

US 2020/0137386 A1 Apr. 30, 2020

Related U.S. Application Data

(63) Continuation of application No. PCT/EP2017/066325, filed on Jun. 30, 2017.

(51) Int. Cl.
*H04N 19/119* (2014.01)
*H04N 19/137* (2014.01)
(Continued)

(52) U.S. Cl.
CPC ......... *H04N 19/119* (2014.11); *H04N 19/137* (2014.11); *H04N 19/159* (2014.11); (Continued)

(58) Field of Classification Search
CPC ............................ H04N 19/119; H04N 19/46
(Continued)

(56) References Cited

U.S. PATENT DOCUMENTS

2009/0196342 A1 8/2009 Divorra Escoda et al.
2009/0268810 A1 10/2009 Dai
(Continued)

FOREIGN PATENT DOCUMENTS

WO 2008016605 A2 2/2008
WO 2008127568 A2 10/2008
WO 2010151334 A1 12/2010

OTHER PUBLICATIONS

Bresenham, "Algorithm for Computer Control of a Digital Plotter," IBM Systems Journal, vol. 4, No. 1, pp. 25-30, (1965).
(Continued)

*Primary Examiner* — Jeffery A Williams
(74) *Attorney, Agent, or Firm* — Leydig, Voit & Mayer, Ltd.

(57) ABSTRACT

The present invention provides an encoder for encoding a frame of a video sequence and a corresponding decoder. The encoder comprises a partitioner and an entropy coder. The partitioner is configured to receive a current block of the frame and obtain a list of candidate geometric partitioning (GP) lines. Each of the candidate GP lines is generated based on information of one or more candidate neighbor blocks of the current block. The partitioner is further configured to determine a final GP line that partitions the current block into two segments, select a GP line from the list of GP lines to obtain a selected GP line, and generate a GP parameter for the current block. The GP parameter includes offset information indicating an offset between the final GP line and the selected GP line. The entropy coder is configured to encode the GP parameter.

25 Claims, 13 Drawing Sheets

HEVC
Proposed
$MV_2$
background
$MV_1$
foreground
Quad-tree + PU
Geometric
(QT-)Binary-tree
Object-based

(51) Int. Cl.
*H04N 19/159* (2014.01)
*H04N 19/176* (2014.01)
*H04N 19/46* (2014.01)
*H04N 19/91* (2014.01)

(52) U.S. Cl.
CPC ........... *H04N 19/176* (2014.11); *H04N 19/46* (2014.11); *H04N 19/91* (2014.11)

(58) Field of Classification Search
USPC ..................................................... 375/240.16
See application file for complete search history.

(56) References Cited

U.S. PATENT DOCUMENTS

| | | | |
|---|---|---|---|
| 2010/0118959 A1 | 5/2010 | Lou et al. | |
| 2010/0208818 A1 | 8/2010 | Yin et al. | |
| 2010/0208827 A1 | 8/2010 | Divorra Escoda et al. | |
| 2012/0147961 A1* | 6/2012 | Guo ..................... | H04N 19/147 375/240.16 |

OTHER PUBLICATIONS

Divorra Escoda et al.,"Geometry-Adaptive Block Partitioning for Video Coding," 2007 IEEE International Conference on Acoustics, Speech, and Signal Processing, pp. 657-660, The Institute of Electrical and Electronics Engineers, New York, New York (Apr. 2007).

* cited by examiner

C0

B0

B1

B2

Current Block

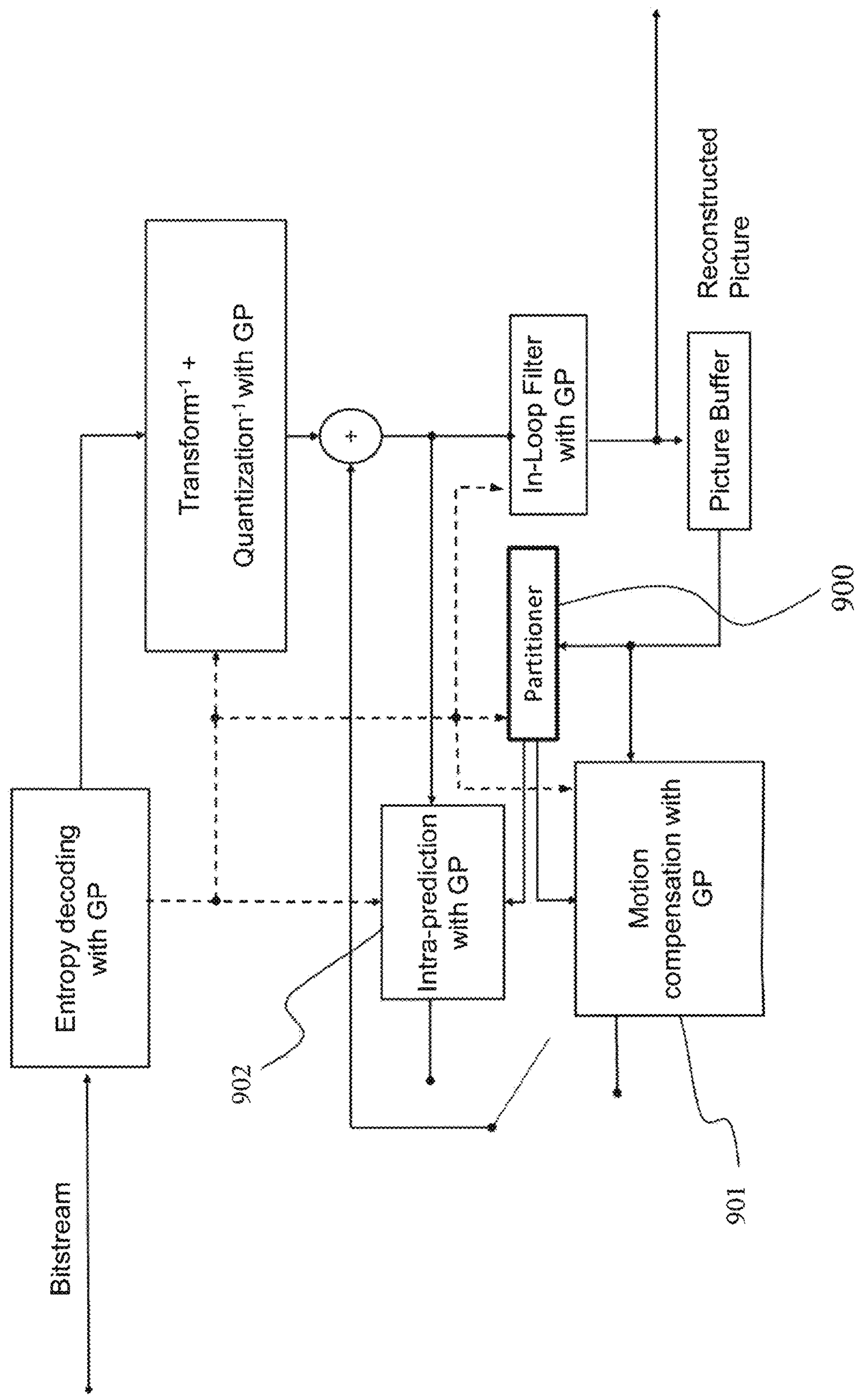
Figure 9 decoder

ENCODER, DECODER, COMPUTER PROGRAM AND COMPUTER PROGRAM PRODUCT FOR PROCESSING A FRAME OF A VIDEO SEQUENCE

CROSS-REFERENCE TO RELATED APPLICATIONS

This application is a continuation of International Application No. PCT/EP2017/066325, filed on Jun. 30, 2017, the disclosure of which is hereby incorporated by reference in its entirety.

TECHNICAL FIELD

The present invention relates to an encoder and a decoder for processing a frame of a video sequence. The encoder and decoder are particularly designed for processing a block of a video sequence using information of a neighbor block.

BACKGROUND

Most video coding techniques use prediction plus residual coding to model video images. Prediction is performed on each frame on a partition basis. That is, each frame is partitioned into blocks and then each block is partitioned into two, three or four segments. For example, quad tree partition separates a block into four parts.

As shown in FIG. 1, a block can be partitioned by different ways. In FIG. 1, a simple scenario of a moving foreground object and a moving background is visualized. The pointer unsmooth quadtree (quadtree-PU) partitioning of high efficiency video coding (HEVC) and the related quad-tree-binary-tree partitioning method are representatives of rectangular block partitioning. Geometric partitioning is achieved by splitting the block with a straight line into two segments (also called wedges).

In case of geometric motion partitioning, the partitioning side-information per block consists of the line parameters, which specify how the block is sliced into two segments. Such line parameters can be specified in terms of two coordinate pairs, an angle and distance from the block center or otherwise, which increases the coding load of the encoder and decoder.

SUMMARY

In view of the above-mentioned problems and disadvantages, the present disclosure describes improvements to conventional approaches. The present disclosure describes an encoder and decoder and a respective encoding method and decoding method able to reduce the signaled side-information relating to a partitioning structure of a block in a video frame.

A first aspect of the present disclosure provides an encoder for encoding a frame in a video sequence. The encoder comprises a partitioning unit and an entropy coding unit, the partitioning unit is configured to receive a current block of the frame, obtain a list including line information representing one or more candidate geometric partitioning (GP) lines, wherein each of the one or more candidate GP lines is generated based on information of one or more candidate neighbor blocks of the current block, determine a final GP line that partitions the current block into two segments, select a GP line from the list of the one or more (e.g. two or more) GP lines to obtain a selected GP line, and generate a GP parameter for the current block, wherein the GP parameter includes an offset information indicating an offset between the final GP line and the selected GP line; the entropy coding unit is configured to encode the GP parameter. For the term geometric partition, the abbreviations "GP" or "GMP" are used interchangeably in this application.

By using the offset information, the present disclosure minimizes the signaled side-information relating to the partitioning structure.

In a first implementation form of the encoder according to the first aspect, the list comprises for each candidate GP line of the one or more candidate GP lines a candidate GP line specific line information that may comprise any of the following information:

(1) a coordinate (x,y) indicating a start point and a coordinate indicating an end point of the respective candidate GP line of the one or more candidate GP lines; and (2) a distance between the respective candidate GP line of the one or more candidate GP lines and a center of the current block, and an angle of the respective candidate GP line of the one or more candidate GP lines.

The information (1) above is a hardware-friendly integer based implementation since coordinates of the intersection points are integer value and hardware implementation always prefer to integer operation.

In a second implementation form of the encoder according to the first implementation form of the first aspect, wherein the offset between the final GP line and the selected GP line comprises an offset between the start point of the selected GP line and a start point of the final GP line, and an offset between the end point of the selected GP line and an end point of the final GP line.

In a third implementation form of the encoder according to any implementation form of the first aspect:

(i) the information of the candidate neighbor block comprises information of a neighbor GP line partitioning the candidate neighbor block and the candidate GP line is generated by extending the neighbor GP line into the current block; and/or (ii) the information of the candidate neighbor block comprises information of a neighbor horizontal or vertical line partitioning the candidate neighbor block into two rectangular segments and the candidate GP line is generated by extending the neighbor horizontal or vertical line into the current block; and/or (iii) the information of the candidate neighbor block comprises an intra prediction mode of the neighbor block and the candidate GP line is generated by analysis of the intra prediction mode; and/or (iv) the information of the candidate neighbor block comprises texture components or motion vector field of the neighbor block and the candidate GP line is generated by performing segmentation of the neighbor block using the texture components or the motion vector field to obtain a neighbor GP line partitioning the candidate neighbor block and extending the neighbor GP line into the current block.

By using any of the information of the candidate neighbor block (iii)-(iv), a candidate GP line can be generated even the neighbor block is non-partitioned.

In a fourth implementation form of the encoder according to any implementation form of the first aspect, wherein the list comprises two or more candidate GP lines, and the partitioning unit is configured to select the candidate GP line from the list that is closest to the final GP line as the selected GP line; or the partitioning unit is configured to select the candidate GP line from the list such that a rate distortion is minimized as the selected GP line.

In a fifth implementation form of the encoder according to any implementation form of the first aspect wherein the GP parameter further includes information of the selected GP line.

In a sixth implementation form of the encoder according to the fifth implementation form of the first aspect wherein:

the information of the selected GP line includes a block index of a selected neighbor block corresponding to the selected GP line; or the list comprises two or more candidate GP lines, the candidate GP line specific line information further comprises a line index for each of the candidate GP lines, and the information of the selected GP line includes a line index of the selected GP line.

In a seventh implementation form of the encoder according to any implementation form of the first aspect wherein:

the candidate neighbor block is one default neighbor block of the current block.

In an eighth implementation form of the encoder according to any implementation form of the first aspect wherein the partitioning unit is configured to determine the final GP line by:

selecting a candidate GP line from the list as an initial GP line;

repeatedly modifying the selected intial GP line to obtain a modified GP line, calculating a rate distortion cost for the modified GP line, and selecting the modified GP line as the final GP line if the rate distortion cost of the modified GP line is below or equal to a threshold; and/or repeatedly modifying the selected intial GP line to obtain a plurality of modified GP lines, calculating a rate distortion cost for each of the plurality of modified GP lines, and selecting the modified GP line with the smallest rate distortion cost.

In a ninth implementation form of the encoder according to any implementation form of the first aspect wherein the offset information comprises a step size and a quantized offset value, wherein an offset between the final GP line and the selected GP line corresponds to a product of the step size and the quantized offset value.

By using the step size and the quantized offset value, the signaled side-information relating to the partitioning structure is further minimized.

A further aspect of the present disclosure provides an encoding method for encoding a frame in a video sequence. The encoding method comprises: receiving a current block of the frame, obtaining a list including line information representing one or more candidate geometric partitioning, GP, lines, wherein each of the one or more candidate GP lines is generated based on information of one or more candidate neighbor blocks of the current block, determining a final GP line that partitions the current block into two segments, selecting a GP line from the list of the one or more (e.g. two or more) GP lines to obtain a selected GP line, generating a GP parameter for the current block, wherein the GP parameter includes an offset information indicating an offset between the final GP line and the selected GP line; and encoding the GP parameter.

Features of implementation forms of the encoding method of this further aspect correspond to the features of the respective implementation forms of the encoder of the first aspect.

A second aspect of the present disclosure provides a decoder for decoding a frame in a video sequence, comprising an entropy decoding unit and a partitioning unit, wherein the entropy decoding unit is configured to decode an encoded geometric partitioning, GP, parameter for the current block, wherein the encoded GP parameter includes an offset information indicating an offset between a final GP line and a selected GP line; and, wherein the partitioning unit is configured to: generate a list including line information representing one or more candidate GP lines, wherein each of the one or more candidate GP lines is generated based on information of each of one or more candidate neighbor blocks of the current block; select a GP line from the list of the one or more GP lines to obtain the selected GP line; and obtain, based on the decoded GP parameter and the selected GP line, the final GP line that partitions the current block into two segments, wherein the GP parameter includes an offset information indicating an offset between the final GP line and the selected GP line.

By using the offset information, the present disclosure minimizes the signaled side-information relating to the partitioning structure.

In a first implementation form of the decoder according to any implementation form of the second aspect, wherein the list comprises for each candidate GP line of the one or more candidate GP lines a candidate GP line specific line information that may comprise any of the following information, (1) a coordinate (x,y) indicating a start point and a coordinate indicating an end point of each of the respective candidate GP line of the one or more candidate GP lines; and (2) a distance between the respective candidate GP line of the one or more candidate GP lines and a center of the current block, and an angle of the respective candidate GP line of the one or more candidate GP lines.

The information (1) above is a hardware-friendly integer based implementation since coordinates of the intersection points are integer value and hardware implementation always prefer to integer operation.

In a second implementation form of the decoder according to the first implementation form of the second aspect, the offset between the final GP line and the selected GP line comprises an offset between the start point of the selected GP line and a start point of the final GP line, and an offset between the end point of the selected GP line and an end point of the final GP line.

In a third implementation form of the decoder according to any implementation form of the second aspect:

(i) the information of the candidate neighbor block comprises information of a neighbor GP line partitioning the candidate neighbor block, and the candidate GP line is generated by extending the neighbor GP line into the current block; and/or (ii) the information of the candidate neighbor block comprises information of a neighbor horizontal or vertical line partitioning the candidate neighbor block into two rectangular segments, and the candidate GP line is generated by extending the neighbor horizontal or vertical line into the current block; and/or (iii) the information of the candidate neighbor block comprises intra prediction mode of the neighbor block, and the candidate GP line is generated based on analysis of the intra prediction mode; and/or (iv) the information of the candidate neighbor block comprises texture components or motion vector field of the neighbor block, and the candidate GP line is generated by: performing segmentation of the neighbor block using the texture components or the motion vector field to obtain a neighbor GP line partitioning the candidate neighbor block; and extending the neighbor GP line into the current block.

By using any of the information of the candidate neighbor block (iii)-(iv), a candidate GP line can be generated even the neighbor block is non-partitioned.

In a fourth implementation form of the decoder according to any implementation form of the second aspect, the encoded GP parameter further includes information of the selected GP line.

In a fifth implementation form of the decoder according to any implementation form of the second aspect:

the information of the selected GP line is a line index of the selected GP line;

the candidate GP line specific line information further includes a line index;

the candidate neighbor block is each of multiple neighbor blocks of the current block; and the partitioning unit is configured to obtain the selected GP line by selecting a candidate GP line from the list according to the line index of the selected GP line as the selected GP line.

In a sixth implementation form of the decoder according to the fourth implementation form of the second aspect:

the information of the selected GP line is a block index of a selected neighbor block corresponding to the selected GP line;

the candidate neighbor block of the current block is the selected neighbor block; and the partitioning unit is configured to obtain the selected GP line by taking the candidate GP line as the selected GP line.

In a seventh implementation form of the decoder according to any implementation form of the second aspect:

the candidate neighbor block is a default neighbor block of the current block; and the partitioning unit is configured to obtain the selected GP line by taking the generated candidate GP line as the selected GP line.

In an eighth implementation form of the decoder according to any implementation form of the second aspect, the offset information comprises a step size and a quantized offset value, wherein an offset between the final GP line and the selected GP line is determined based on a product of the step size and the reduced offset value.

By using the step size and the quantized offset value, the signaled signaled side-information relating to the partitioning structure is further minimized.

A further aspect of the present disclosure provides a decoding method for decoding a frame in a video sequence, the decoding method comprising: decoding an encoded geometric partitioning, GP, parameter for the current block, wherein the encoded GP parameter includes an offset information indicating an offset between a final GP line and a selected GP line; generating a list including line information representing one or more candidate GP lines, wherein each of the one or more candidate GP lines is generated based on information of each of one or more candidate neighbor blocks of the current block; selecting a GP line from the list of the one or more GP lines to obtain the selected GP line; and obtaining, based on the decoded GP parameter and the selected GP line, the final GP line that partitions the current block into two segments, wherein the GP parameter includes an offset information indicating an offset between the final GP line and the selected GP line.

Features of implementation forms of the decoding method of this further aspect correspond to the features of the respective implementation forms of the decoder of the second aspect.

A third aspect of the present disclosure provides another encoder for encoding a frame in a video sequence, comprising a processor, wherein the processor is configured to:

receive a current block of the frame;

obtain a list including line information representing one or more candidate geometric partitioning, GP, lines, wherein each of the one or more candidate GP lines is generated based on information of one or more candidate neighbor blocks of the current block;

determine a final GP line that partitions the current block into two segments;

select a GP line from the list of the one or more [two or more] GP lines to obtain a selected GP line;

generate a GP parameter for the current block, wherein the GP parameter includes an offset information indicating an offset between the final GP line and the selected GP line; and encode the GP parameter.

A fourth aspect of the present disclosure provides another decoder for decoding a frame in a video sequence, comprising a processor, wherein the processor is configured to:

decode an encoded geometric partitioning, GP, parameter for the current block, wherein the encoded GP parameter includes an offset information indicating an offset between a final GP line and a selected GP line;

generate a list including line information representing one or more candidate GP lines, wherein each of the one or more candidate GP lines is generated based on information of each of one or more candidate neighbor blocks of the current block;

select a GP line from the list of the one or more [two or more] GP lines to obtain the selected GP line; and obtain, based on the decoded GP parameter and the selected GP line, the final GP line that partitions the current block into two segments, wherein the GP parameter includes an offset information indicating an offset between the final GP line and the selected GP line.

A fifth aspect of the present disclosure provides a computer program with program code means for performing all steps according to the first aspect if the program is executed on a computer or a digital signal processor.

A sixth aspect of the present disclosure provides a computer program product having a computer readable medium with stored program code means for performing all steps according to the first aspect if the program is executed on a computer or a digital signal processor.

A seventh aspect of the present disclosure provides a computer program with program code means for performing all steps according to the second aspect if the program is executed on a computer or a digital signal processor.

A eighth aspect of the present disclosure provides a computer program product having a computer readable medium with stored program code means for performing all steps according to the second aspect if the program is executed on a computer or a digital signal processor.

BRIEF DESCRIPTION OF DRAWINGS

The above described aspects and implementation forms of the present disclosure will be explained in the following description of specific embodiments in relation to the enclosed drawings, in which

FIG. 4 shows neighbor blocks of the current block according to an embodiment;

FIG. 9 shows a decoder according to an embodiment;

DETAILED DESCRIPTION OF EMBODIMENTS

Illustrative embodiments of apparatuses, methods, and program products for encoding an image using intra-prediction coding are described with reference to the various figures. Although this description provides detailed examples of possible implementations, it should be noted that the details are intended to be exemplary and in no way limit the scope of the application.

Any terminology mentioned in one embodiment/example is applicative to the other embodiments/examples. A certain embodiment/example may reference to other embodiments/examples.

The present application is relevant to an encoder, decoder, computer program, and computer program product for processing a frame of a video sequence.

Embodiment 1: Encoder

Figure 1:
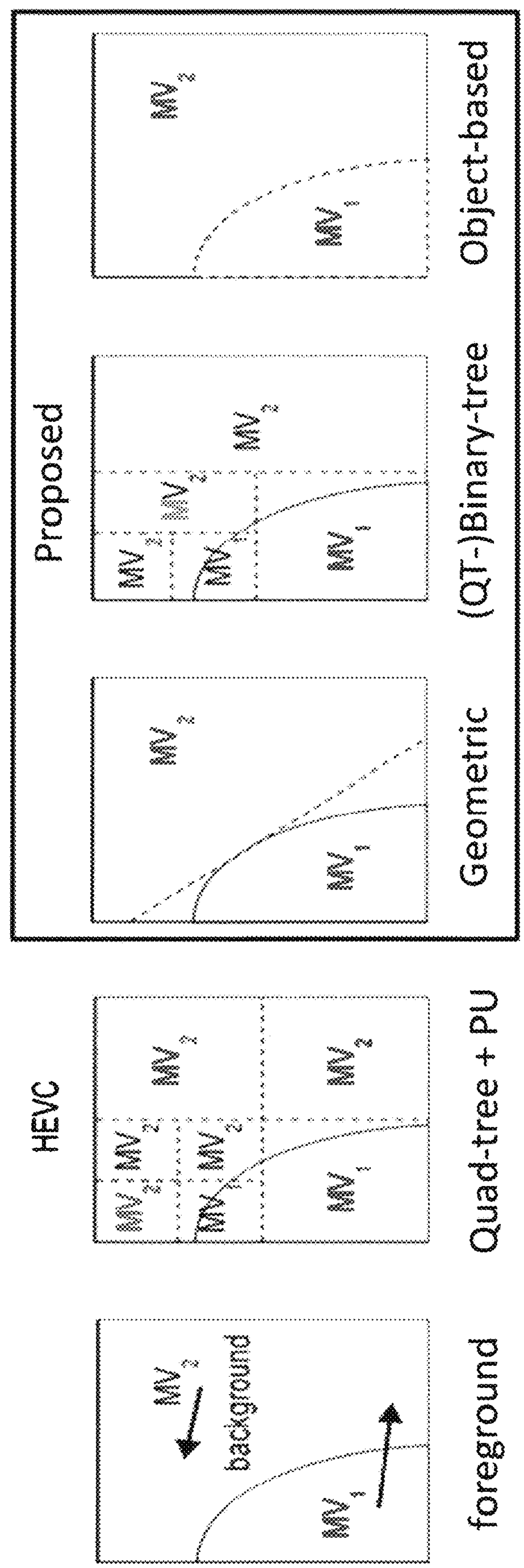
FIG. 1 shows examples for traditional partitioning methods.
Figure 2:
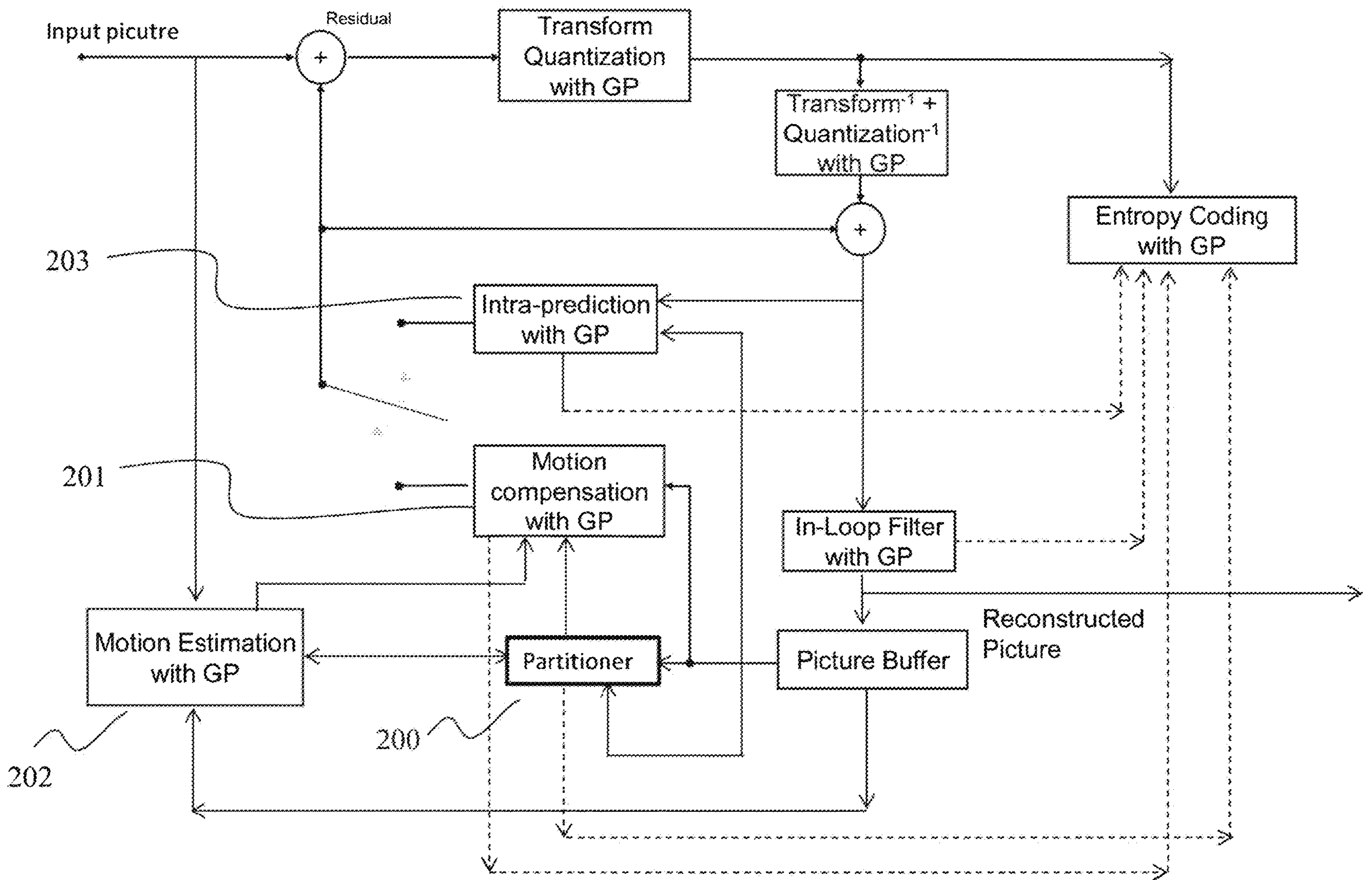
FIG. 2 shows an encoder according to an embodiment.

FIG. 2 shows an example of an encoder for encoding a frame of a video sequence. In FIG. 2, the geometric block partitioning used for motion estimation and motion compensation is generated by a partitioning unit (e.g. partitioner) 200.

The partitioning unit 200 is connected to both of the motion estimation unit 202 and motion compensation unit 201 for inter prediction and the intra estimation/prediction unit 203 for intra prediction. As partitioning and motion/intra estimation for GP can be considered a coupled optimization problem, which is typically performed in an iterative manner, the information between partitioning unit 200 and motion/intra estimation may flow in both directions.

In an example, the partitioning unit 200 may also perform an analysis of the original input image to obtain an initial partitioning for increased encoder performance. Using this block partitioning, segment-wise motion estimation or intra estimation is performed and a rate-distortion cost is calculated. A partitioning refinement step is performed, followed by another motion estimation or motion estimation refinement or intra estimation step. This iterative process may continue for a fixed amount of cycles or until a certain rate-distortion threshold is met.

Figure 3A:
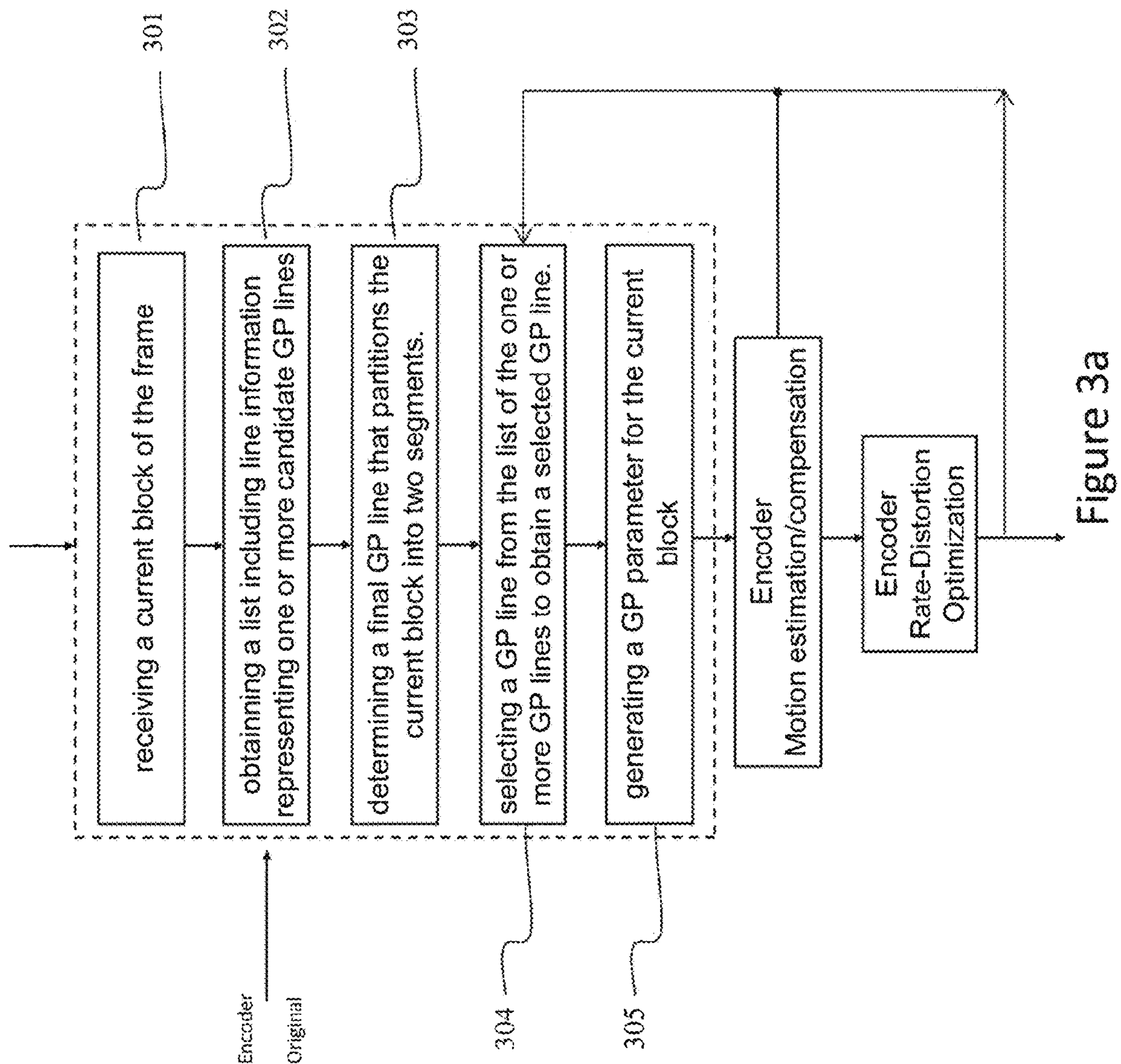
FIG. 3*a* shows a block diagram of the partitioning unit of the encoder for inter prediction.
Figure 3B:
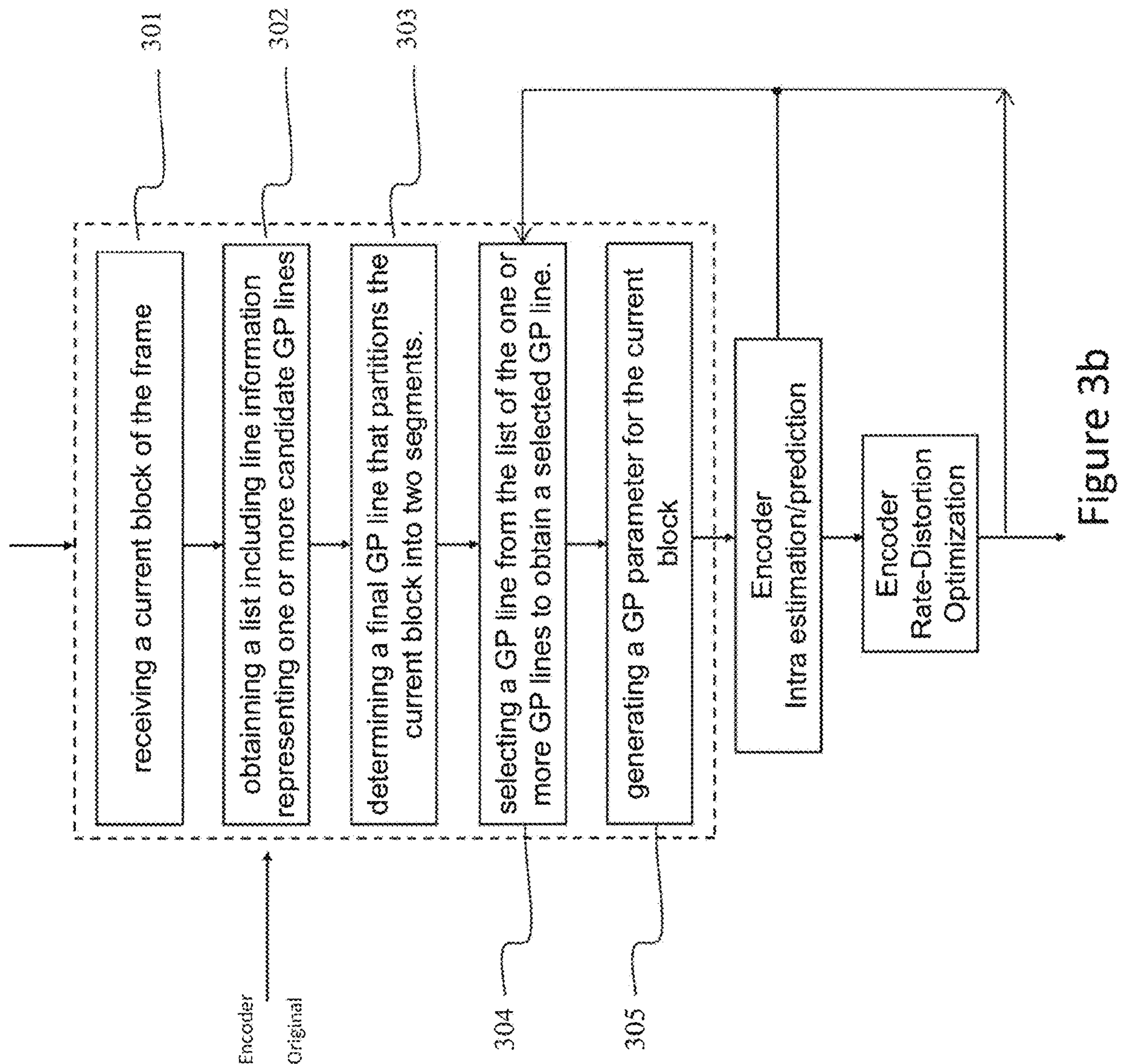
FIG. 3*b* shows a block diagram of the partitioning unit of the encoder for intra prediction.

FIG. 3*a* shows a block diagram of the partitioning unit 200 for inter prediction. FIG. 3*b* shows a block diagram of the partitioning unit 200 for intra prediction. Aspects of the partitioning unit 200 are encircled by the dashed line. Input of the partitioning unit 200 is the current reconstructed picture along with all side-information relating to the reconstructed picture, such as intra-prediction modes, motion vectors and partitioning information of the neighbor blocks.

A main aspect of the present invention concerns the partitioning unit 200 as for example shown in FIG. 3*a* and FIG. 3*b*, and the entropy coding of the GP parameter generated by the partitioning unit 200.

Correspondingly, the encoder of the present invention mainly comprises a partitioning unit and an entropy coding unit. The partitioning unit is configured to generate a GP (geometric partitioning) parameter for a current block while the entropy coding unit is configured to encode the GP parameter.

To generate the GP parameter, the partitioning unit may be configured to perform the following steps 301-306.

Step 301. receiving a current block of the frame.

Step 302. obtaining a list including line information representing one or more candidate GP lines.

The list may be in different forms or formats, such as table, information sequence, and so on.

The partitioning unit may obtain the list, e.g. by generating the list or by reading it from its local storage (internal or external).

Figure 4:
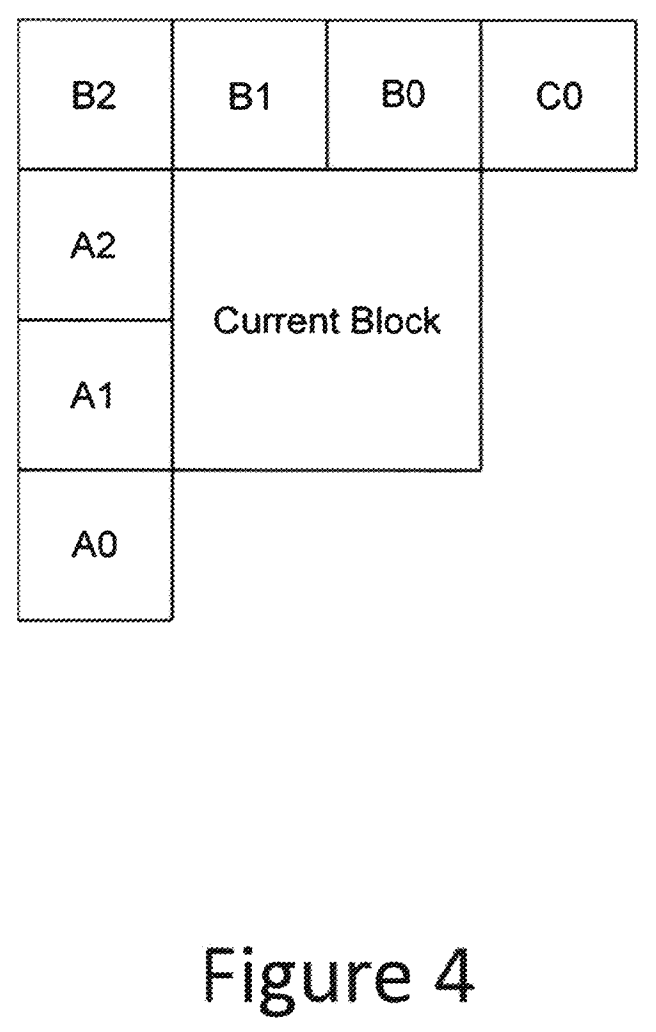

Each candidate GP lines may be generated based on information of one or more candidate neighbor blocks of the current block. As shown in FIG. 4, a neighbor block is a block adjacent to the current block, and precedes the current block in coding order. The size of the neighbor block may be same to or different from the size as the current block. The number of the candidate GP lines may depend on the number of the available neighbor blocks.

Optionally, the candidate neighbor block may be one default neighbor block of the current block. In this case, the list has only one candidate GP line generated based on the default neighbor block and the only one candidate GP line will be taken as the selected GP line in the following step 304. Since the decoder also knows the default neighbor block, in the following step 305, it is not necessary to carry any information of the selected GP line in the GP parameter to be sent to the decoder.

The default neighbor block may be determined according to a position of the current block within a current frame. For example, the default neighbor block having fixed position around the current block, such as on the left, right, or top of the current block.

Step 303. determining a final GP line that partitions the current block into two segments.

The partitioning unit may be configured to determine the final GP line by performing sub steps 303*a*-303*b*:

303*a*. selecting (e.g. randomly selecting) a candidate GP line from the list as an initial GP line; and

303*b*. repeatedly modifying the selected initial GP line to obtain a modified GP line, calculating a rate distortion cost for the modified GP line, and selecting the modified GP line as the final GP line if the rate distortion cost of the modified GP line is below or equal to a threshold.

Optionally, the partitioning unit may also be configured to determine the final GP line by performing the above sub step 303*a* and following sub steps 303*c*-303*d:*

303*c*. repeatedly modifying the selected initial GP line to obtain a plurality of modified GP lines, calculating a rate distortion cost for each of the plurality of modified GP lines, and

303*d*. selecting the modified GP line with the smallest rate distortion cost.

Optionally, the partitioning unit is configured to obtain the final GP by performing an analysis of the original texture of the current block (i.e. based on content of the video).

Step 303 may be performed before or after step 302.

Step 304. selecting a GP line from the list of the one or more GP lines to obtain a selected GP line.

As mentioned in the aforementioned step 302, the list may involve one or more candidate GP lines. In the former case, the one candidate GP line may be generated based on one neighbor block or one default neighbor block.

If the list comprises two or more candidate GP lines, the partitioning unit is configured to select the candidate GP line from the list by different ways. For example, the partitioning unit may select a GP line that is closest to the final GP line as the selected GP line. For another example, the partitioning unit can select the candidate GP line from the list such that a rate distortion is minimized as the selected GP line.

Step 305. generating a GP parameter for the current block. The GP parameter includes an offset information indicating an offset between the final GP line and the selected GP line.

The GP parameter may further include information of the selected GP line. For example, the information of the selected GP line includes a block index of a selected neighbor block corresponding to the selected GP line. For another example, if the list comprises two or more candidate GP lines, the candidate GP line specific line information further comprises a unique line index for each of the candidate GP lines, and correspondingly the information of the selected GP line includes a line index of the selected GP line.

The offset information comprises a step size and a quantized offset value, wherein an offset between the final GP line and the selected GP line corresponds to a product of the step size and the quantized offset value. This solution further minimizes the signaled side-information relating to the partitioning structure. Alternatively, the offset information can be encoded directly without the step size and the quantized offset.

For example, a candidate GP line on the list may be represented by two coordinate pairs $(x_p, y_p)=\{(x_s, y_s), (x_e, y_e)\}$, which specify the start- and end-points of the GMP line. To further refine the GP prediction, two offset values $\Delta=\{\Delta s, \Delta e\}$ may be applied to the start- and end-point to reach the final GMP partitioning line $(x_f, y_f)=\{(x_{s,f}, y_{s,f}), (x_{e,f}, y_{e,f})\}$. Each offset value $\Delta$ is a signed integer, where the sign determines the direction and the value determines the number of pixels/samples multiplied by a quantization and block size B dependent step size $k_{QP}$ by which the respective predicted point is moved. In case the step size $k_{QP}$ is not fixed, step size $k_{QP}$ can be encoded and transmitted from an encoder to a decoder. The final GMP partitioning line $(x_f, y_f)$ and each offset value $\Delta$ are represented by following equations (1)-(3).

$$\begin{pmatrix} x_f \\ y_f \end{pmatrix} = \begin{pmatrix} x_p \\ y_p \end{pmatrix} + k_{QP} \cdot \Delta \cdot \begin{pmatrix} v_1 \\ v_2 \end{pmatrix} \tag{1}$$

-continued $$\begin{pmatrix} \Delta_{s,x} \\ \Delta_{s,y} \end{pmatrix} = \begin{pmatrix} x_{f,s} \\ y_{f,s} \end{pmatrix} - \begin{pmatrix} x_{p,s} \\ y_{p,s} \end{pmatrix} \tag{2}$$

$$\begin{pmatrix} \Delta_{e,x} \\ \Delta_{e,y} \end{pmatrix} = \begin{pmatrix} x_{f,e} \\ x_{f,e} \end{pmatrix} - \begin{pmatrix} x_{p,e} \\ y_{p,e} \end{pmatrix} \tag{3}$$

Parameters v1 and v2 are used to control the direction of the offset adjustment. They are used in the equation. The values of v1 and v2 may depend on the values of $(x_p, y_p)$ and$\Delta$ as shown in the following table 1:

TABLE 1

Parameterization of the block boundary.

| $x_p$ | $y_p$ | $\Delta$ | $v_1$ | $v_2$ |
|---|---|---|---|---|
| 0 | 0 | >0 | 1 | 0 |
| 0 | 0 | <0 | 0 | 1 |
| $0 < x_p < B$ | 0 | — | 1 | 0 |
| B | 0 | >0 | 0 | 1 |
| B | 0 | <0 | 1 | 0 |
| B | $0 < y_p < B$ | — | 0 | 1 |
| B | B | >0 | 1 | 0 |
| B | B | <0 | 0 | 1 |
| $0 < x_p < B$ | B | — | 1 | 0 |
| 0 | B | >0 | 0 | 1 |
| 0 | B | <0 | 1 | 0 |
| 0 | $0 < y_p < B$ | — | 0 | 1 |

As mentioned, the step size $k_{QP}$ may depend on the block size and the quantization parameter. For big blocks or high quantization parameters, a large $k_{QP}$ can be used. For small blocks or low quantization parameters, a small $k_{QP}$ can be used. As an example, $k_{QP}$ can be 4 for 128×128 blocks, $k_{QP}$ can be 2 for 64×64 blocks and $k_{QP}$ can be 1 for blocks not larger than 64×64. Further, $k_{QP}$ may be adapted according to the angle of initial partitioning line. As one example, the partition of the neighbor block can be used as initial partitioning line. If an initial partition has a small angle, a small $k_{QP}$ is preferred. If an initial partition is a steep line, a big $k_{QP}$ is preferred.

Step 306, generating a binary pattern by using the final GP line parameters.

For the object of the present invention, step 306 is optional. The binary pattern labels each pixel/sample depending on which side of the partitioning line the pixel/sample lies. To determine the rasterized points, which represent the closest representation of the straight line given the two points, the well-known Bresenham line algorithm may be employed.

At the encoder side, the determination of the offset values $\Delta=\{\Delta s, \Delta e\}$ is again subject to a rate-distortion optimization process. Typically, an iterative approach is chosen, consisting of consecutive steps of motion estimation using the GP pattern and variation of the GP offsets until a rate-distortion criterion is minimized.

As an example, a binary mask/pattern M(x,y) assigning each pixel/sample of a given block to a specific segment can be derived using the two following equations (7)-(8):

$$f(x, y) = \begin{vmatrix} x_s - x & y_s - y \\ x_e - x & y_e - y \end{vmatrix} \tag{7}$$

$$M(x, y)\begin{cases} 0, & \text{if } f(x, y) \geq 0 \\ 1, & \text{otherwise} \end{cases} \tag{8}$$

In equations (7)-(8), $(x_s, y_s)$ and $(x_e, y_e)$ are the starting and ending points of the partitioning line.

In above step 302, the list may comprise for each candidate GP line of the one or more candidate GP lines a candidate GP line specific line information that may be in following form (i) or (ii):

(i) the candidate GP line specific line information comprises a coordinate (x,y) indicating a start point and a coordinate indicating an end point of the respective candidate GP line of the one or more candidate GP lines.

The start point and the end point are two intercept points lying on the boundary of the current block. The offset between the final GP line and the selected GP line comprises an offset between the start point of the selected GP line and a start point of the final GP line, and an offset between the end point of the selected GP line and an end point of the final GP line.

Due to the coding of GP parameters using boundary intercept values (which e.g. can be the relative coordinate values of the two intercept points using the top, left point of a coding block as the origin coordinates (0,0)), a hardware-friendly integer based implementation is achievable unlike GP methods using angle and distance pairs. The coordinates of the intersection points are integer value. Hardware implementation always prefer to integer operation.

(ii) the candidate GP line specific line information comprises a radius ρ or a distance (i.e. length of radius) between the respective candidate GP line of the one or more candidate GP lines and a center of the current block, and an angle θ of the respective candidate GP line of the one or more candidate GP lines.

The radius and angle two parameters can model the partitioning by:

$$f(x,y)=x\cos\theta+y\sin\theta-\rho$$

The radius is vertical/orthogonal to the respective candidate GP line of the one or more candidate GP lines. The angle may be an angle between the candidate GP line and an axis (horizontal or vertical) of the current block, or between the radius and an axis of the current block.

In above step 302, the way by which the partitioning unit generates the candidate GP lines depends on the form of the information of the candidate neighbor block, which is described below.

(i) The information of the candidate neighbor block may comprise information of a neighbor GP line partitioning the candidate neighbor block. Correspondingly, the partitioning unit is configured to generate the candidate GP line by extending the neighbor GP line into the current block.

Figure 5:
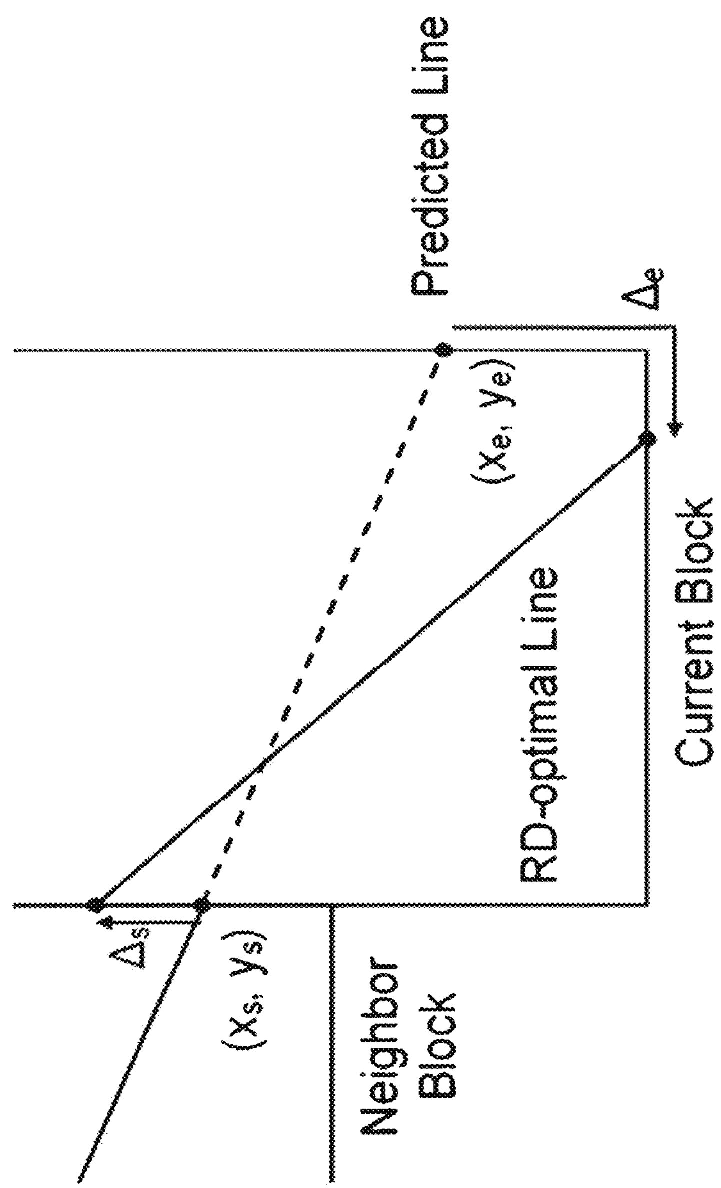
FIG. 5 shows an example of generating a candidate GP line according to information of a neighbor block according to an embodiment.

If the neighbor block is also coded using the GP mode, the GP line partitioning of the neighbor block is extended into the current block. This is exemplified in FIG. 5. It can be seen that the final GP line of the current block can be generate based on linear continuation of a GP line of a neighbor block and additional shifting of the line coordinates by two offset values.

The intercept points $(x_s, y_s)$ and $(x_e, y_e)$ on the current block can be calculated in equation (4).

$$\begin{pmatrix} x_{[s,e]} \\ y_{[s,e]} \end{pmatrix} = \begin{pmatrix} \dfrac{(x_{s,o}y_{e,o} - y_{s,o}x_{e,o})(x_{s,b} - x_{e,b}) - (x_{s,o} - x_{e,o})(x_{s,b}y_{e,b} - y_{s,b}x_{e,b})}{(x_{s,o} - x_{e,o})(y_{s,b} - y_{e,b}) - (y_{s,o} - y_{e,o})(x_{s,b} - x_{e,b})} \\ \dfrac{(x_{s,o}y_{e,o} - y_{s,o}x_{e,o})(y_{s,b} - y_{e,b}) - (y_{s,o} - y_{e,o})(x_{s,b}y_{e,b} - y_{s,b}x_{e,b})}{(x_{s,o} - x_{e,o})(y_{s,b} - y_{e,b}) - (y_{s,o} - y_{e,o})(x_{s,b} - x_{e,b})} \end{pmatrix} \quad (4)$$

In equation (4), $(x_{s,b}, y_{s,b})$ and $(x_{e,b}, y_{e,b})$ specify a line on the current block boundary and $(x_{s,o}, y_{s,o})$ and $(x_{e,o}, y_{e,o})$ specifies the GP line of the neighbor block. Moreover, offset values (Δs, Δe) may be added to the determined intercept positions $(x_s, y_s)$ and $(x_e, y_e)$, which is detailed in step 306 described later.

(ii) The information of the candidate neighbor block may comprise information of a neighbor horizontal or vertical line partitioning the candidate neighbor block into two rectangular segments. Correspondingly, the partitioning unit is configured to generate the candidate GP line by extending the neighbor horizontal or vertical line into the current block.

Figure 6:
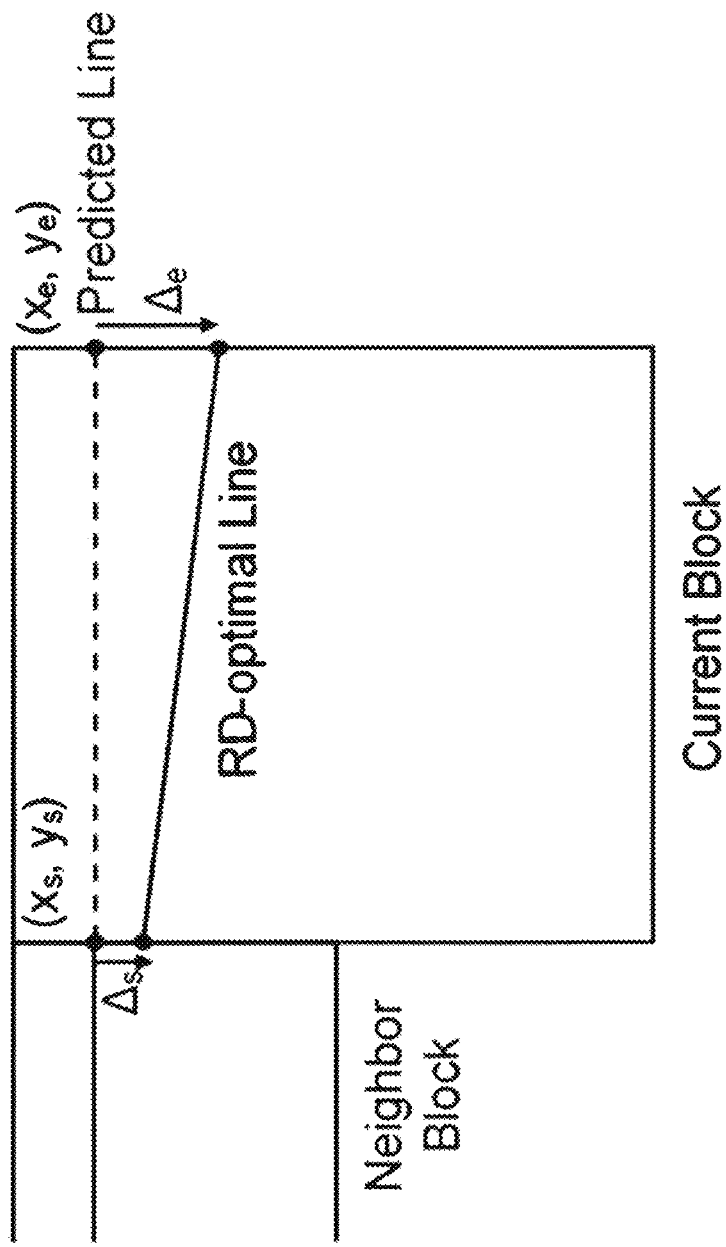
FIG. 6 shows another example of generating a candidate GP line according to information of a neighbor block according to an embodiment.

If the neighbor block (e.g. HEVC block) is using a rectangular block partitioning, e.g. a horizontal or vertical partitioning, the horizontal or vertical line separating the neighbor block can be extended into the current block. This is indicated in FIG. 6. The intercept points of the rectangular block partitioning line and the current block boundaries can be calculated in the same manner as specified in equation (4).

(iii) The information of the candidate neighbor block may comprise an intra prediction mode of the neighbor block. Correspondingly, the partitioning unit is configured to generate the candidate GP line by analysis of the intra prediction mode.

Figure 7:
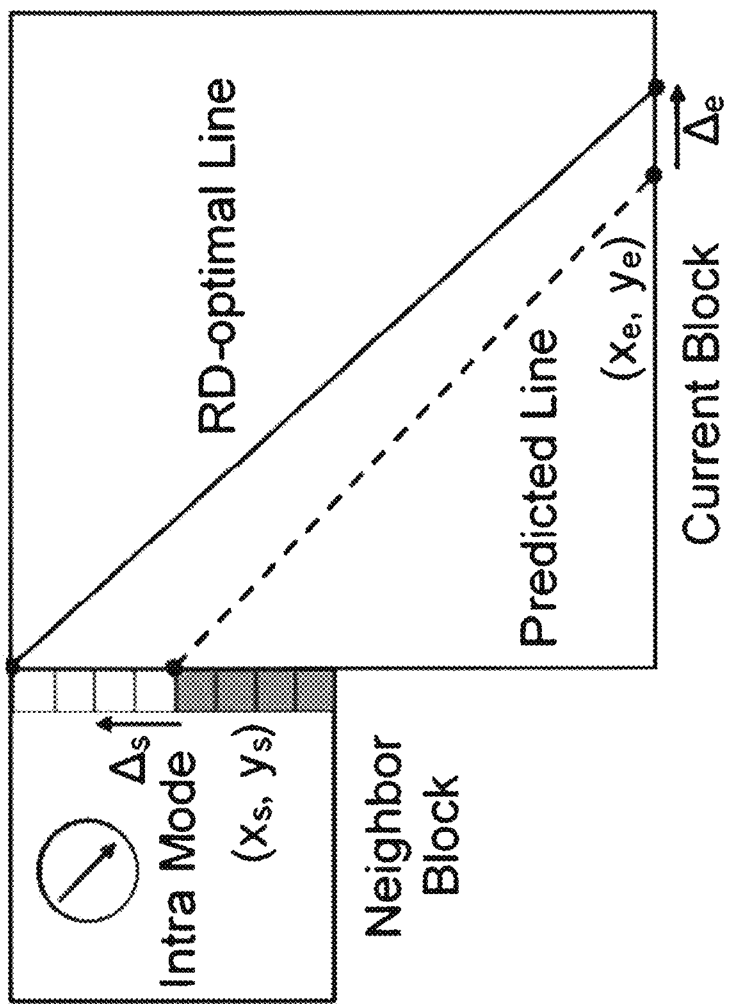
FIG. 7 shows another example of generating a candidate GP line according to information of a neighbor block according to an embodiment.
Figure 8:
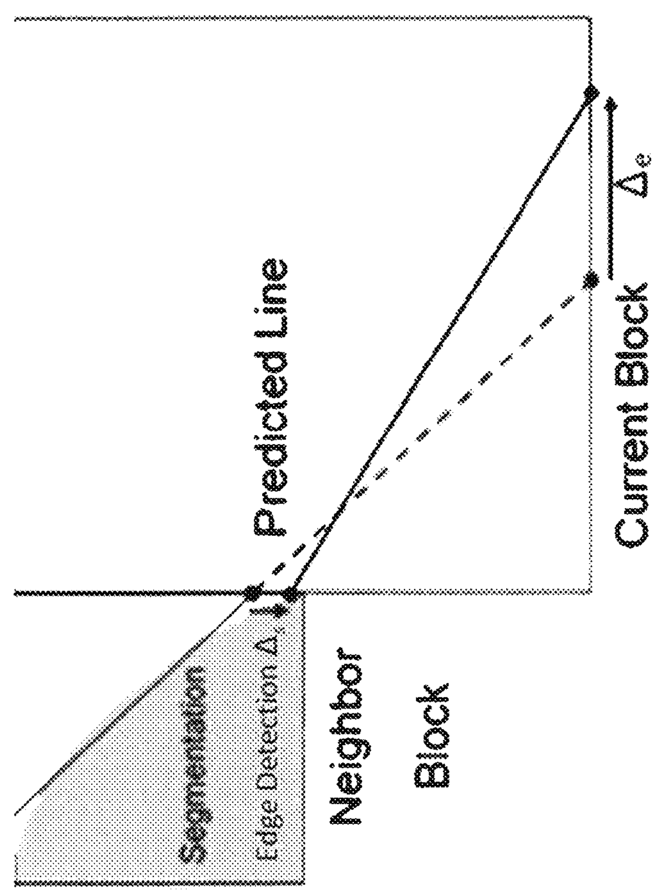
FIG. 8 shows another example of generating a candidate GP line according to information of a neighbor block according to an embodiment.

That is, even if the neighbor block is not partitioned, a candidate GP line can be generated. In one example, the intra prediction direction, as indicated in FIG. 7, may be combined with an analysis of the texture gradient along a region of samples at the block boundary of the neighbor block. The point where the gradient is highest may be chosen as the starting point $(x_s, y_s)$ of the candidate GP line. The directional intra mode is taken as the slope of the candidate GP line. The end-point $(x_e, y_e)$ can be derived by calculating the point of intersection between the candidate GP line and the boundary as specified in equation (4).

(iv) The information of the candidate neighbor block may comprise texture components or motion vector field of the neighbor block. Correspondingly, the partitioning unit is configured to generate the candidate GP line by performing segmentation of the neighbor block using the texture components or the motion vector field to obtain a neighbor GP line partitioning the candidate neighbor block and extending the neighbor GP line into the current block.

That is, even the neighbor block is non-partitioned, a candidate GP line can be generated. For example a candidate GP line can be derived through analysis of the reconstructed samples of the texture components or by analysis of the motion vector field in case the neighbor block is constituted of smaller blocks. Segmentation can be used to perform edge detection. The detected edge in the texture component which can be used as the slope of the predicted GMP line. Motion information is widely used in video analysis for moving object segmentation using the dense motion vectors. If a neighbor block is inter-coded and motion vector field is available, segmentation can be done using motion information. The direction of the segmentation can be used as a predictor of GP line in this case.

Different approaches from the area of image segmentation and/or edge-detection may be used to generate a partitioning of the neighbor block, which is extended into the current block. In one example, the candidate GP line may be generated by following steps (1)-(5).

(1) Split the block into two segments using a partitioning line, which may be chosen from an initial set of partitionings or from a previous iteration;

(2) Apply offset values to the start and end position of the partitioning line;

(3) Assign each pixel/sample of the block as belonging to either one of the segments separated by the partitioning line;

(4) For each segment, calculate the variance of each component and calculate a weighted variance $\sigma_w^k$ and compute a per block cost term $D_n$ for the current iteration n as following equations (5)-(6).

$$\sigma_w^k=\Sigma_{i=1}^{C}\Sigma_{j\in N_k}w_i(p_{j,i}-\mu_i^k)^2,k=1,2 \quad (5)$$

$$D_n=\Sigma_{k=1}^{2}\sigma_w^k \quad (6)$$

In equations (5)-(6), parameter C is the total number of color space components used, $N_k$ the set of pixels/samples assigned to a segment k, $w_i$ the weight assigned to a color component, $p_{j,i}$ the color component value and $\mu_i^k$ the sample mean per component per segment.

(5) Repeat steps (1)-(4) and maximize $D_n$ for a fixed number of iterations or until $D_n$ has reached a predetermined threshold level.

Besides the list generated based on information of the aforementioned neighbor block, a template list may be involved. For example, the template list may comprise candidate GP lines generated based on a template block. To distinguish these two lists, the one in step 302-305 may be called "spatial list". Correspondingly, steps 302-305 are replaced with following steps 302'-305' that are different from steps 303-305 by including an additional template list and information relevant to the template list.

302'. obtain a spatial list and a template list.

The template list includes line information representing one or more candidate GP lines,

303'. determine a final GP line that partitions the current block into two segments;

304'. select a GP line from the spatial list and the template list to obtain a selected GP line. The selected GP line may be from the spatial list or the template list.

305'. generate a GP parameter for the current block, wherein the GP parameter includes an offset information indicating an offset between the final GP line and the selected GP line. For example, the GP parameter may comprise following flags:

(i) GMP Mode Signalling Flag

The GMP mode signalling flag may be a GMP_CU_Flag. For each inter-predicted block, a GMP_CU_Flag is coded, which specifies if GMP is used for the current block. Otherwise, if the codec also supports rectangular motion partitioning, those partitioning structures are signaled.

If GMP is used for the current block, the GMP_CU_Flag is set to be true and the following Prediction mode flag is coded.

Optionally, the GMP_CU_Flag may be coded using context-adaptive-binary-arithmetic-coding using different contexts, depending on the GMP mode usage of the current blocks neighborhood.

(ii) Prediction Mode Flag

The Prediction mode flag indicates that the selected GMP line is from the template list or the spatial list. The Prediction mode flag may be GMP_PredictionMode_Flag.

If the GMP_PredictionMode_Flag is false, the following unsigned line index for the template list is coded.

If the GMP_PredictionMode_Flag is true, the following line index for the spatial list is coded.

Optionally, The GMP_Prediction_Mode_Flag may also be entropy coded using CABAC and use different models depending on information of the neighbor block.

(iii) Line Index for the Template List

This line index specifies which candidate GP line on the template list is used. The index addresses a specific entry of a template list. An example of this index may be GMP_TemplateIdx.

The list index may be binarized using truncated unary coding, which is displayed in table 2.

TABLE 2

Truncated unary coding of the list index value.

| List Index | Code |
|---|---|
| 0 | 0 |
| 1 | 10 |
| 2 | 110 |
| 3 | 1110 |
| . . . | . . . |

(iv) Line Index for the Spatial List

This index specifies that a candidate GP line on the spatial list is used. The index addresses a specific entry of the spatial list. An example of this index may be GMP_PredictorIdx.

(v) Two Integer Offset Values

These offset values specify how the selected GP line is refined to obtain the final GP line. Motion data such as motion vectors, motion vector differences, reference frame indices or motion vector merging data is coded after the partitioning. These offset values may be GMP_Offsets={Δs, Δe}

The offset values may be binarized using a combination of a larger than zero flag (LZ-Flag), a sign flag (S-Flag) and a combination of Truncated Rice coding with an appended Exp-Golomb code for the remaining value. An example of such a coding scheme is given in table 3.

TABLE 3

Exemplified coding of the offset values for geometric partitioning lines. Here, a coding using a larger-zero flag, a sign-flag and a code using Truncated Rice and Exp-Golomb coding is used.

| Offset Value | LZ-Flag | S-Flag | Remainder Code |
|---|---|---|---|
| . . . | . . . | . . . | . . . |
| −2 | 1 | 1 | 10 |
| −1 | 1 | 1 | 0 |
| 0 | 0 | — | — |
| 1 | 1 | 0 | 0 |
| 2 | 1 | 0 | 10 |
| 3 | 1 | 0 | 110 |
| 4 | 1 | 0 | 1110 |
| 5, 6 | 1 | 0 | 11110 {0, 1} |
| 7, . . . , 10 | 1 | 0 | 111110 {0, 1} {0, 1} |
| . . . | . . . | . . . | . . . |

Context adaptive coding may be used for the LZ-Flag, S-Flag and code word bins which are part of the Truncated Rice code, while the appended Exp-Golomb code may be coded in bypass mode, meaning no context adaption for the remaining bins is applied and an equiprobable distribution is assumed.

Embodiment 2: Decoder

FIG. 9 shows an example of a decoder for decoding a frame of a video sequence. In FIG. 9, the geometric block partitioning used for motion compensation is generated by a partitioning unit (e.g. partitioner) 900.

The partitioning unit 900 is connected to both of the motion compensation unit 901 for inter prediction and the intra estimation unit 902 for intra prediction. Input of the partitioning unit 900 are the decoded GP parameter of the current block and the reconstructed neighboring blocks along with all side-information relating to the reconstructed blocks, such as intra-prediction modes, motion vectors and partitioning information of the neighbor block.

A main aspect of the present invention concerns the partitioning unit 900 and the entropy coding of the GP parameter generated by the partitioning unit 900.

Correspondingly, the decoder of the present invention may mainly comprise an entropy decoding unit and a partitioning unit. The entropy decoding unit is configured to decode an encoded GP parameter for a current block. The GP parameter is same as the GP parameter described in the aforementioned encoder embodiment (e.g. step 305, step step 305', GMP mode signaling flag, Prediction mode flag, Line index for the template list, Line index for the spatial list, two integer offset values).

Figure 10A:
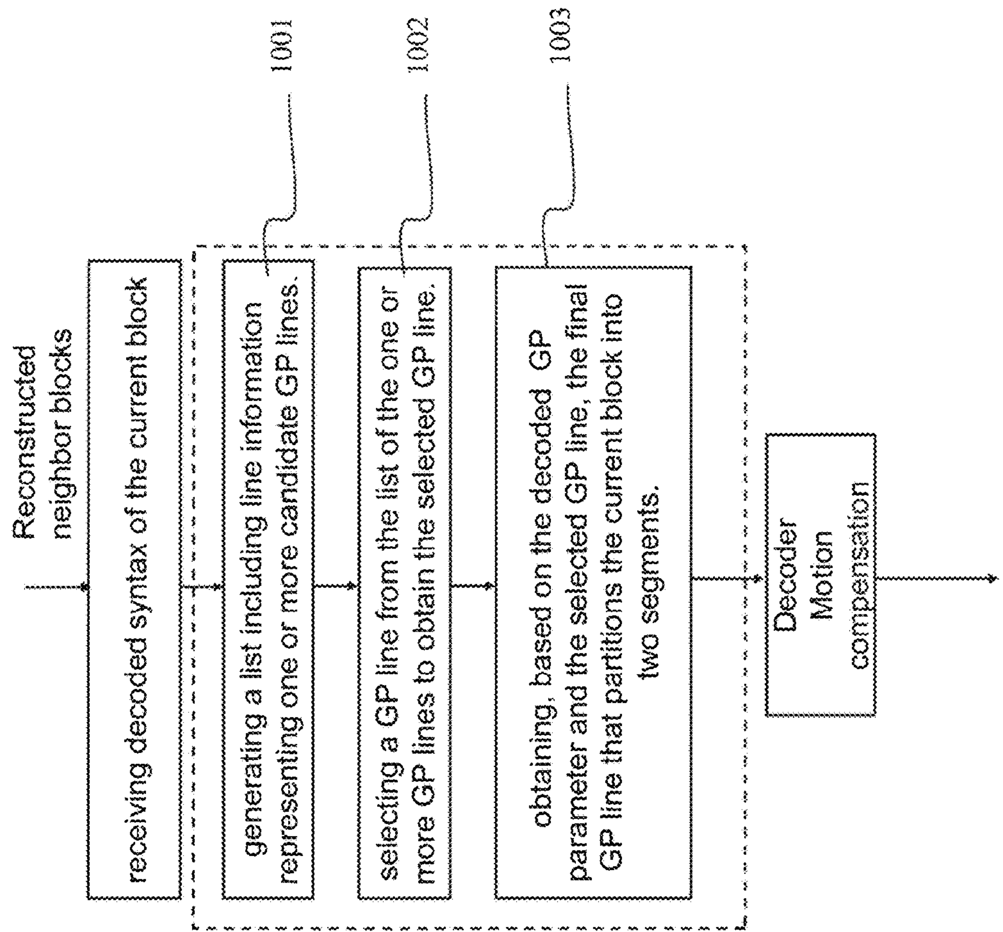
FIG. 10*a* shows a block diagram of the partitioning unit of the decoder for inter prediction.
Figure 10B:
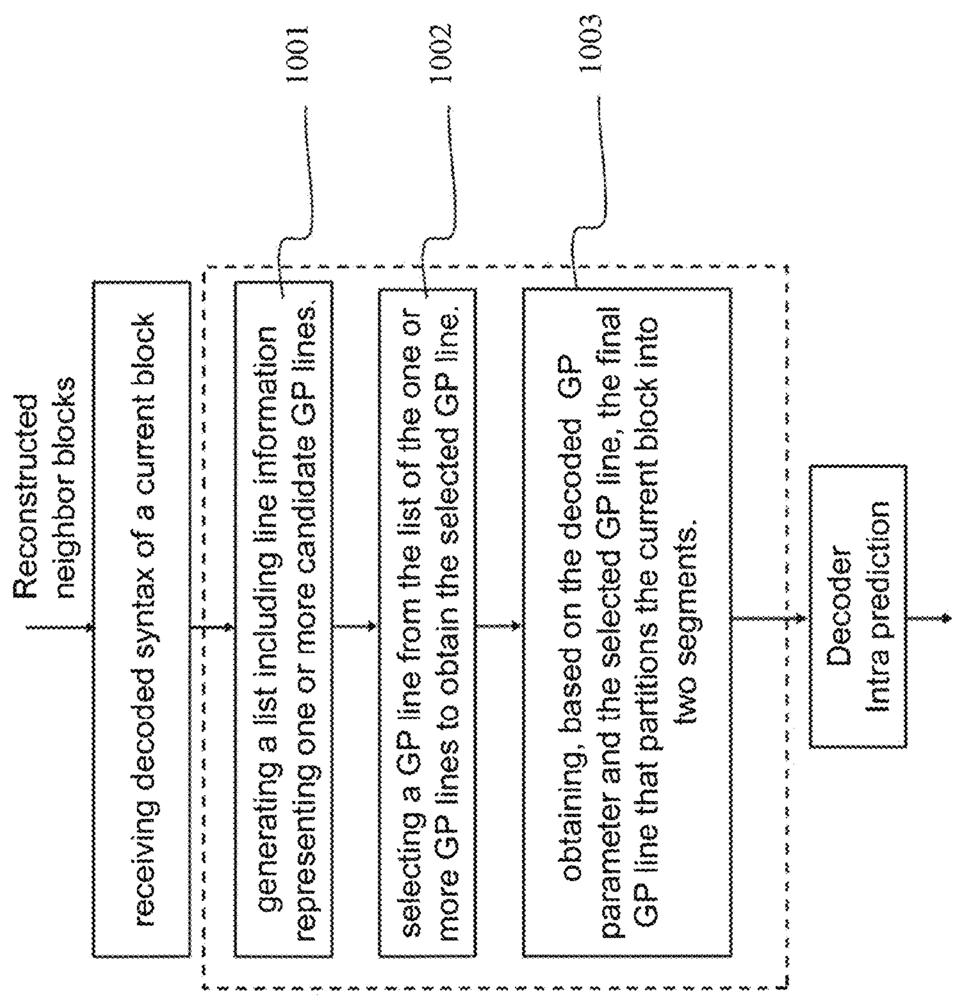
FIG. 10*b* shows a block diagram of the partitioning unit of the decoder for intra prediction.

The partitioning unit is configured to perform following steps 1001-1003 shown in FIGS. 10*a*-10*b*. FIG. 10*a* involves inter prediction while FIG. 10*b* involves intra prediction.

Step 1001. generating a list including line information representing one or more candidate GP lines. The list is the same as the list in the aforementioned encoder embodiment (e.g. step 302). This step may be performed dependent on or independent from the decoded GP parameter, which will be describe in the following step 1002.

The partitioning unit may obtain the list, e.g. by generating the list or by reading it from its local storage (internal or external). The list may comprise for each candidate GP line a candidate GP line specific line information. For example, the candidate GP line specific line information comprises a coordinate (x,y) indicating a start point and a coordinate indicating an end point of each of the respective candidate GP line of the one or more candidate GP lines. For another example, the candidate GP line specific line information comprises a distance or radius between the respective candidate GP line of the one or more candidate GP lines and a center of the current block, and an angle of the respective candidate GP line of the one or more candidate GP lines. If the list involves two or more candidate GP lines, the candidate GP line specific line information may further include a line index.

Optionally, each of the one or more candidate GP lines is generated based on information of each of one or more candidate neighbor blocks of the current block.

The information of the candidate neighbor block may comprise information of a neighbor GP line partitioning the candidate neighbor block. Correspondingly, the candidate GP line is generated by extending the neighbor GP line into the current block.

Optionally, the information of the candidate neighbor block comprises information of a neighbor horizontal or vertical line partitioning the candidate neighbor block into two rectangular segments. Correspondingly, the candidate GP line is generated by extending the neighbor horizontal or vertical line into the current block.

Optionally, the information of the candidate neighbor block comprises intra prediction mode of the neighbor block. Correspondingly, the candidate GP line is generated based on analysis of the intra prediction mode.

Optionally, the information of the candidate neighbor block comprises texture components or a motion vector field of the neighbor block. Correspondingly, the candidate GP line is generated by: performing segmentation of the neighbor block using the texture components or the motion vector field to obtain a neighbor GP line partitioning the candidate neighbor block, and extending the neighbor GP line into the current block.

The list may involve: (i) two or more candidate GP lines generated based on information of two or more neighbor blocks, (ii) one candidate GP line generated based on information of one neighbor blocks, or (iii) one candidate GP line generated based on a default neighbor block, or (iv) one candidate GP line generated based on decoded block index of a neighbor block included in the decoded GP parameter.

Step 1002. selecting a GP line from the list of the one or more GP lines to obtain the selected GP line based on the decoded GP parameter or derived (in case only one default neighboring block) index.

The decoded GP parameter may further include information of the selected GP line that includes following examples.

The information of the selected GP line may be a line index of the selected GP line. In this case, the partitioning unit 900 may generate in the step 1001 one or more candidate GP lines and select in this step 1002 a candidate GP line corresponding to the decoded line index as the selected GP line. It can be seen that in this case the list is generated independent of the decoded GP parameter.

The information of the selected GP line may also be a block index of a selected neighbor block corresponding to the selected GP line. In this case, the partitioning unit may generate, in the above step 1001, a candidate GP line based on the block index and take, in this step 1002, the generated candidate GP line as the selected GP line. It can be seen that in this case the list is generated dependent on the decoded GP parameter.

Optionally, the GP parameter does not include information of the selected GP line. In this case, the partitioning unit 900 may generate, in the above step 1001, a candidate GP line based on information of a default neighbor block and take it as the selected GP line in this step 1002. It can be seen that in this case the list is generated independent of the decoded GP parameter.

Step 1003. obtaining, based on the decoded GP parameter and the selected GP line, the final GP line that partitions the current block into two segments.

As mentioned above, the decoded GP parameter may comprise an offset. Therefore, the partitioning unit is able to obtain the final line through the selected GP line plus the offset. For example, if the offset is coded using step size and quantization, the final offset is obtained based on the equations (1)-(3) and table 1 in the above encoder embodiment.

The partitioning unit is further configured to perform following step 104.

Step 1004. generating a binary pattern by using the final GMP line parameters.

For the object of the present invention, step 1004 is optional. The binary pattern is same as the aforementioned step 306 of the encoder embodiment. At the decoder side, the generated binary pattern/mask is used for motion compensation.

Besides the list generated based on information of the aforementioned neighbor block, a template list may be involved. For example, the template list is the same as the one in the aforementioned encoder embodiment. To distinguish these two lists, the one in steps 1001-1003 may be called "spatial list". Correspondingly, steps 1001-1003 are replaced with following steps 1001'-1003' that are different from steps 1001-1003 by including an additional template list and information relevant to the template list:

Step 1001'. generating a spatial list and a template list.

As an alternative implementation, each list may include only one candidate GP line.

Step 1002'. selecting a GP line from the spatial list and the template list to obtain the selected GP line.

The partitioning unit may select the GP line based on the decoded GP parameter. For example, the GP parameter may include a line index of the selected GP line and a list index of one list (spatial or template list). Therefore the partitioning unit is able to select, from the list corresponding to the list index, a candidate GP line corresponding to the line index as the selected GP line.

Step 1003'. obtaining, based on the decoded GP parameter and the selected GP line, the final GP line that partitions the current block into two segments.

Figure 11:
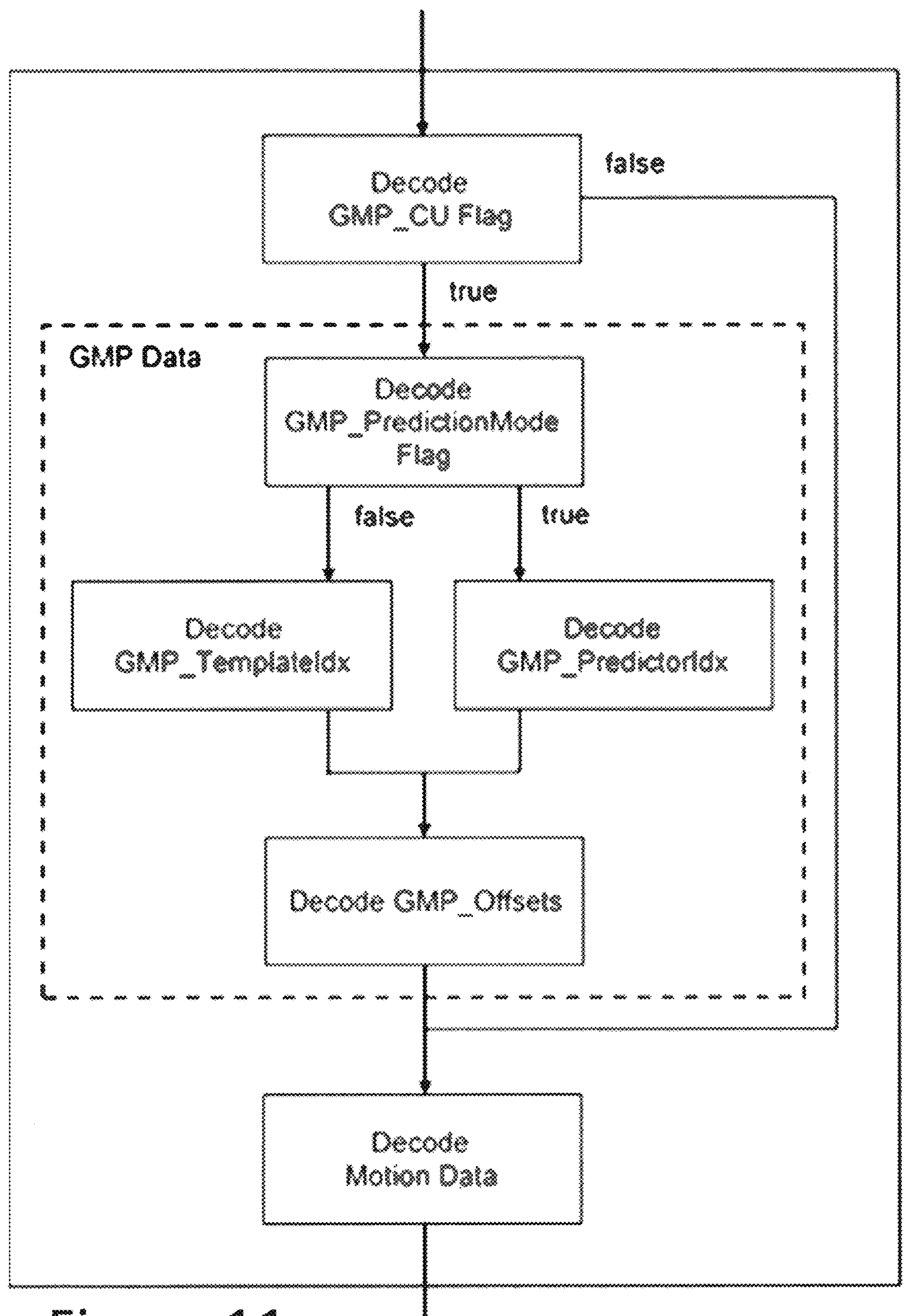
FIG. 11 shows a process of decoding the flags included in a GP respectively GMP parameter.

The process of decoding the flags in the aforementioned step 304' is illustrated in FIG. 11.

Although embodiments of the invention may have been mainly described with regard to encoder and decoder embodiments of the invention, the disclosure equally applies to encoding method and decoding method embodiments of the invention, and vice versa where applicable.

Embodiments of the invention may be implemented as hardware, firmware, software or any combination thereof. For example, the functionality of an embodiment may be performed by a processor, a microcontroller, a digital signal processor (DSP), a field programmable gate array (FPGA), an application-specific integrated circuit (ASIC), or the like.

The functionality of an embodiments may be implemented by program instructions stored on a computer readable medium. The program instructions, when executed, cause the computer, processor or the like, to perform the steps of the encoding and/or decoding methods. The computer readable medium can be any medium on which the program is stored such as a read only memory (ROM), a random access memory (RAM), a Blu ray disc, DVD, CD, USB (flash) drive, hard disc, server storage available via a network, etc.

Embodiments of the disclosure may be implemented in various devices including a TV set, set top box, PC, tablet, smartphone, or the like. The functionality may be implemented by means of a software, e.g. an application implementing the method steps.

In other words, ALL of the processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. An encoder for encoding a frame of a video sequence, comprising:

a partitioner; and an entropy coder, wherein the partitioner is configured to:

receive a current block of the frame;

obtain a list of one or more candidate geometric partitioning (GP) lines, wherein each of the one or more candidate GP lines is the same as the GP line information of one or more neighbor blocks of the current block;

determine a final GP line that partitions the current block into two segments;

select a GP line from the list of the one or more candidate GP lines to obtain a selected GP line; and generate a GP parameter for the current block, wherein the GP parameter includes offset information indicating an offset between the final GP line and the selected GP line, wherein the entropy coder is configured to encode the GP parameter.

2. The encoder according to claim 1, wherein the list comprises, for each respective candidate GP line of the one or more candidate GP lines, respective candidate GP line specific line information, wherein the respective candidate GP line specific line information comprises a coordinate (x,y) indicating a start point and a coordinate indicating an end point of the respective candidate GP line, or wherein the respective candidate GP line specific line information comprises a distance between the respective candidate GP line and a center of the current block, and an angle of the respective candidate GP line.

3. The encoder according to claim 2, wherein the offset between the final GP line and the selected GP line comprises an offset between the start point of the selected GP line and a start point of the final GP line, and an offset between the end point of the selected GP line and an end point of the final GP line.

4. The encoder according to claim 1, wherein the one or more neighbor blocks includes a first candidate neighbor block, wherein the information of the one or more neighbor blocks includes information of the first candidate neighbor block, wherein the one or more candidate GP lines includes a first candidate GP line, and wherein:

the information of the first candidate neighbor block comprises information of a neighbor GP line partitioning the first candidate neighbor block and the first candidate GP line is generated by extending the neighbor GP line into the current block; and/or the information of the first candidate neighbor block comprises information of a neighbor horizontal or vertical line partitioning the first candidate neighbor block into two rectangular segments and the first candidate GP line is generated by extending the neighbor horizontal or vertical line into the current block; and/or the information of the first candidate neighbor block comprises an intra prediction mode of the first candidate neighbor block and the first candidate GP line is generated by analysis of the intra prediction mode; and/or the information of the first candidate neighbor block comprises texture components or motion vector field of the first candidate neighbor block and the first candidate GP line is generated by performing segmentation of the first candidate neighbor block using the texture components or the motion vector field to obtain a neighbor GP line partitioning the first candidate neighbor block and extending the neighbor GP line into the current block.

5. The encoder according to claim 1, wherein the list comprises two or more candidate GP lines, and wherein the partitioner is further configured to select, as the selected GP line, the candidate GP line from the list that is closest to the final GP line or the partitioner is further configured to select the selected GP line such that a rate distortion is minimized.

6. The encoder according to claim 1, wherein the GP parameter further includes information of the selected GP line.

7. The encoder according to claim 6, wherein:

the information of the selected GP line includes a block index of a selected neighbor block corresponding to the selected GP line; or the list comprises two or more candidate GP lines and a line index for each of the candidate GP lines, and the information of the selected GP line includes a line index of the selected GP line.

8. The encoder according to any of claim 1, wherein the one or more candidate neighbor blocks includes one default neighbor block of the current block.

9. The encoder according to claim 1, wherein the partitioning unit is configured to determine the final GP line by:

selecting a candidate GP line from the list as an initial GP line; and one or more of:

repeatedly modifying the selected initial GP line to obtain a modified GP line, calculating a rate distortion cost for the modified GP line, and selecting the modified GP line as the final GP line if the rate distortion cost of the modified GP line is below or equal to a threshold, and repeatedly modifying the selected initial GP line to obtain a plurality of modified GP lines, calculating a rate distortion cost for each of the plurality of modified GP lines, and selecting the modified GP line with the smallest rate distortion cost.

10. The encoder according to claim 1, wherein the offset information comprises a step size and a quantized offset value, wherein an offset between the final GP line and the selected GP line corresponds to a product of the step size and the quantized offset value.

11. A decoder for decoding a frame in a video sequence, comprising:

an entropy decoder; and a partitioner, wherein the entropy decoder is configured to decode an encoded geometric partitioning (GP) parameter for a current block, wherein the encoded GP parameter includes offset information indicating an offset between a final GP line and a selected GP line, and wherein the partitioner is configured to:

obtain a list of one or more candidate GP lines, wherein each of the one or more candidate GP lines is the same as the GP line information of each of one or more neighbor blocks of the current block;

select a GP line from the list of the one or more candidate GP lines to obtain the selected GP line; and obtain, based on the decoded GP parameter and the selected GP line, the final GP line, wherein the final GP line partitions the current block into two segments, and wherein the GP parameter includes offset information indicating an offset between the final GP line and the selected GP line.

12. The decoder according to claim 11, wherein the list comprises, for each respective candidate GP line of the one or more candidate GP lines, respective candidate GP line specific line information, wherein the respective candidate GP line specific line information comprises a coordinate (x,y) indicating a start point and a coordinate indicating an end point of the respective candidate GP line; or wherein the respective candidate GP line specific line information comprises a distance between the respective candidate GP line and a center of the current block, and an angle of the respective candidate GP line.

13. The decoder according to claim 12, wherein the offset between the final GP line and the selected GP line comprises an offset between the start point of the selected GP line and a start point of the final GP line, and an offset between the end point of the selected GP line and an end point of the final GP line.

14. The decoder according to claim 11, wherein the one or more neighbor blocks includes a first candidate neighbor block, wherein the information of the one or more neighbor blocks includes information of the first candidate neighbor block, wherein the one or more candidate GP lines includes a first candidate GP line, and wherein:

the information of the first candidate neighbor block comprises information of a neighbor GP line partitioning the first candidate neighbor block, and the first candidate GP line is generated by extending the first neighbor GP line into the current block; and/or the information of the first candidate neighbor block comprises information of a neighbor horizontal or vertical line partitioning the first candidate neighbor block into two rectangular segments, and the first candidate GP line is generated by extending the neighbor horizontal or vertical line into the current block; and/or the information of the first candidate neighbor block comprises intra prediction mode of the first candidate neighbor block, and the first candidate GP line is generated based on analysis of the intra prediction mode; and/or the information of the first candidate neighbor block comprises texture components or motion vector field of the first candidate neighbor block, and the first candidate GP line is generated by:

performing segmentation of the neighbor block using the texture components or the motion vector field to obtain a neighbor GP line partitioning the first candidate neighbor block; and extending the neighbor GP line into the current block.

15. The decoder according to claim 11, wherein the encoded GP parameter further includes information of the selected GP line.

16. The decoder according to any of claim 15, wherein the information of the selected GP line is a line index of the selected GP line;

wherein the list includes a line index for each of the one or more candidate GP lines, wherein the one or more neighbor blocks are each of multiple neighbor blocks of the current block; and wherein the partitioner is further configured to obtain the selected GP line by selecting a candidate GP line from the list according to the line index of the selected GP line.

17. The decoder according to claim 15, wherein the information of the selected GP line is a block index of a selected neighbor block corresponding to the selected GP line;

wherein the one or more neighbor blocks of the current block include the selected neighbor block; and wherein the partitioner is further configured to obtain the selected GP line by taking the candidate GP line as the selected GP line.

18. The decoder according to claim 11, wherein the one or more neighbor blocks include a default neighbor block of the current block; and wherein the partitioner is configured to obtain the selected GP line by taking the generated candidate GP line as the selected GP line.

19. The decoder according to claim 11, wherein the offset information comprises a step size and a quantized offset value, wherein an offset between the final GP line and the selected GP line is determined based on a product of the step size and the quantized offset value.

20. An encoder for encoding a frame in a video sequence, comprising:

a processor, the processor being configured to:

receive a current block of the frame;

obtain a list of one or more candidate geometric partitioning (GP) lines, wherein each of the one or more candidate GP lines is the same as the GP line information of one or more neighbor blocks of the current block;

determine a final GP line that partitions the current block into two segments;

select a GP line from the list of the one or more candidate GP lines to obtain a selected GP line;

generate a GP parameter for the current block, wherein the GP parameter includes offset information indicating an offset between the final GP line and the selected GP line; and encode the GP parameter.

21. A decoder for decoding a frame in a video sequence, comprising:

a processor, the processor being configured to:

decode an encoded geometric partitioning (GP) parameter for a current block, wherein the encoded GP parameter includes offset information indicating an offset between a final GP line and a selected GP line;

obtain a list of one or more candidate GP lines, wherein each of the one or more candidate GP lines is the same as the GP line information of each of one or more neighbor blocks of the current block;

select a GP line from the list of the one or more candidate GP lines to obtain the selected GP line; and obtain, based on the decoded GP parameter and the selected GP line, the final GP line, wherein the final GP line partitions the current block into two segments, and wherein the GP parameter includes offset information indicating an offset between the final GP line and the selected GP line.

22. A computer program with program code, stored on a non-transitory computer readable medium, for performing all steps according to claim 1 if the program is executed on a computer or a digital signal processor.

23. A computer program product having a non-transitory computer readable medium with stored program code means for performing all steps according to claim 1 if the program is executed on a computer or a digital signal processor.

24. A computer program with program code, stored on a non-transitory computer readable medium, for performing all steps according to claim 11 if the program is executed on a computer or a digital signal processor.

25. A computer program product having a non-transitory computer readable medium with stored program code means for performing all steps according to claim 11 if the program is executed on a computer or a digital signal processor.

* * * * *

UNITED STATES PATENT AND TRADEMARK OFFICE

CERTIFICATE OF CORRECTION

PATENT NO. : 11,039,137 B2
APPLICATION NO. : 16/730800
DATED : June 15, 2021
INVENTOR(S) : Zhao et al.

It is certified that error appears in the above-identified patent and that said Letters Patent is hereby corrected as shown below:

In the Claims

Claim 8: Column 19, Line 22: "one or more candidate neighbor blocks includes one default" should read -- one or more neighbor blocks includes one default --.

Signed and Sealed this
Sixteenth Day of August, 2022

Katherine Kelly Vidal

Katherine Kelly Vidal
*Director of the United States Patent and Trademark Office*